(12) United States Patent
Probert et al.

(10) Patent No.: US 9,628,279 B2
(45) Date of Patent: Apr. 18, 2017

(54) PROTECTING APPLICATION SECRETS FROM OPERATING SYSTEM ATTACKS

(71) Applicant: Microsoft Technology Licensing, LLC, Redmond, WA (US)

(72) Inventors: David B. Probert, Woodinville, WA (US); Jeff Engel, Redmond, WA (US); Arsalan Ahmad, Redmond, WA (US); Arun U. Kishan, Kirkland, WA (US); Jonathan E. Lange, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 14/502,965

(22) Filed: Sep. 30, 2014

(65) Prior Publication Data

US 2016/0092678 A1    Mar. 31, 2016

(51) Int. Cl.
*G06F 11/30* (2006.01)
*G06F 12/14* (2006.01)
(Continued)

(52) U.S. Cl.
CPC ........ *H04L 9/3236* (2013.01); *G06F 9/45558* (2013.01); *G06F 12/1458* (2013.01);
(Continued)

(58) Field of Classification Search
CPC .. G06F 12/14; G06F 12/1408; G06F 12/1416; G06F 21/6218; G06F 12/1491;
(Continued)

(56) References Cited

U.S. PATENT DOCUMENTS 7,028,305 B2 *  4/2006  Schaefer .................. G06F 9/54
                                                        718/104
8,364,910 B2 *  1/2013  Wilkerson ............ G06F 12/145
                                                        711/152
(Continued)

FOREIGN PATENT DOCUMENTS

WO    WO2009088175 A2    7/2002

OTHER PUBLICATIONS

"Android Security Overview", Published on: May 18, 2013, Available at: https://source.android.com/devices/tech/security/, 13 pages.
(Continued)

*Primary Examiner* — Jayesh Jhaveri
(74) *Attorney, Agent, or Firm* — Lee & Hayes, PLLC (57) ABSTRACT

Various embodiments provide techniques and devices for protecting application secrets from operating system attacks. In some examples, applications execute with an isolated user mode of a secure execution environment, while relying on an operating system executing within a separate execution environment for resource management and system services. A proxy kernel can control access by the operating system to data associated with the secure execution environment. Further, the proxy kernel can act as a transparent interface between isolated user mode applications and the operating system during the provision of resource management and system services.

20 Claims, 7 Drawing Sheets

(51) Int. Cl.
*H04L 9/32* (2006.01)
*G06F 9/455* (2006.01)
*G06F 21/53* (2013.01)
*G06F 21/62* (2013.01)
*G06F 12/08* (2016.01)

(52) U.S. Cl.
CPC .......... *G06F 21/53* (2013.01); *G06F 21/6218* (2013.01); *G06F 9/45533* (2013.01); *G06F 12/08* (2013.01); *G06F 12/14* (2013.01); *G06F 12/1408* (2013.01); *G06F 12/1416* (2013.01); *G06F 12/1491* (2013.01); *G06F 2009/45587* (2013.01)

(58) Field of Classification Search
CPC . G06F 9/45533; H04L 63/14; H04L 63/1408; H04L 63/1416
See application file for complete search history.

(56) References Cited

U.S. PATENT DOCUMENTS

| | | | |
|---|---|---|---|
| 8,782,670 B2 | 7/2014 | Havemose | |
| 2004/0078568 A1* | 4/2004 | Pham | H04L 63/101 713/165 |
| 2004/0243783 A1* | 12/2004 | Ding | G06F 12/1491 711/170 |
| 2005/0033980 A1* | 2/2005 | Willman | G06F 21/57 726/26 |
| 2005/0114683 A1* | 5/2005 | Jin | G06F 21/6218 713/187 |
| 2008/0148300 A1 | 6/2008 | Archer et al. | |
| 2010/0023565 A1* | 1/2010 | Colbert | G06F 9/4856 711/E12.001 |
| 2011/0016301 A1* | 1/2011 | Galicia | G06F 9/461 713/2 |
| 2011/0082962 A1 | 4/2011 | Horovitz et al. | |
| 2011/0154500 A1 | 6/2011 | Sahita et al. | |
| 2011/0296164 A1* | 12/2011 | Boebert | G06F 21/604 713/150 |
| 2012/0017213 A1 | 1/2012 | Hunt et al. | |
| 2013/0031374 A1† | 1/2013 | Thom et al. | |
| 2013/0097354 A1 | 4/2013 | Arges et al. | |
| 2013/0340077 A1 | 12/2013 | Salsamendi et al. | |
| 2014/0115330 A1* | 4/2014 | Chen | H04L 63/18 713/166 |
| 2015/0082304 A1* | 3/2015 | Hepkin | G06F 21/53 718/1 |
| 2015/0082378 A1* | 3/2015 | Collison | H04L 63/20 726/1 |
| 2015/0100791 A1* | 4/2015 | Chen | G06F 12/1408 713/189 |
| 2016/0156665 A1* | 6/2016 | Mooring | G06F 9/45558 726/1 |

OTHER PUBLICATIONS

Baumann, et al., "Secure Execution of Unmodified Applications on an Untrusted Host", In Proceedings of the 24th ACM Symposium on Operating Systems Principles, Nov. 2013, 1 page.

Hofmann, et al., "InkTag: Secure Applications on an Untrusted Operating System", In Proceedings of Architectural Support for Programming Languages and Operating Systems, Mar. 16, 2013, 14 pages.

"Wind River VxWorks Platforms 6.9", Published on: Sep. 15, 2011, Available at: http://www.windriver.com/products/product-notes/PN_VE_6_9_Platform_0311.pdf, 32 pages.

"Windows Data Protection", Published on: Oct. 2001, Available at: http://msdn.microsoft.com/en-us/library/ms995355.aspx, 10 Pages.

"Windows Platform Design", Retrieved on: Aug. 5, 2014, Available at: https://www.google.com/url?sa=t&rct=j&q=&esrc=s&source=web&cd=4&ved=0CDgQFjAD&url=http%3A%2F%2Fwww.microsoft.com%2Fresources%2Fngscb%2Fdocuments%2Fngscb_security_model.doc&ei=n3LgU5iDCYqHuATQhYHYBA&usg=AFQjCNEXcj4_6eiAlaiG8DMduQvJgF_h9A&sig2=btRwoFSC1QdSbBQzpbGq2w&byrn=bv.72197243,d.c2E&cad=rja, 13 pages.

PCT Search Report & Written Opinion for Application No. PCT/US2015/052762, mailed on Nov. 30, 2015, 12 pages.

The PCT Written Opinion of the International Preliminary Examining Authority mailed Jul. 13, 2016 for PCT application No. PCT/US2015/052762, 5 pages.

ARM Security Technology, Building a Secure System using TrustZone Technology, Figure 5-1 on p. 67, Dec. 2008.†

* cited by examiner
† cited by third party

PROTECTING APPLICATION SECRETS FROM OPERATING SYSTEM ATTACKS

BACKGROUND

Many applications contain secrets that must be protected from unauthorized access. Further, many computing architectures require exposing these secrets to system software, such as an operating system (OS) kernel, under the assumption that the system software can be trusted. For instance, OS components executing within the OS kernel have full access to the system's memory, and thus access to application secrets stored within the system's memory. As such, the safety of application secrets is susceptible to attacks by compromised and/or malicious system software.

Isolating the execution of an application is one security practice utilized to protect application data from unauthorized access. Isolation often includes providing a tightly controlled set of resources to an application. However, isolation is primarily used to protect an application from untrustworthy applications running on the same system. Further, isolation techniques commonly require the use of two operating systems or two virtual machines, which is inefficient, resource intensive and/or requires modification to application code.

SUMMARY

This disclosure describes systems and methods for protecting application secrets from unauthorized access by an operating system, while relying on the operating system for resource management. Such secrets can include encryption keys, passwords, protected content, and/or application binary code. Further, OS resource management can include resource allocation, memory management, memory scheduling, CPU scheduling, thread creation, and/or thread synchronization.

For example, a computing device can implement a method comprising managing an operating system execution environment comprising a first user mode and a first kernel mode, and managing a secure execution environment comprising a second user mode and a second kernel mode. Further, the computing device can execute an isolated process within the second user mode of the secure execution environment, and provide one or more system services of the first kernel mode to the isolated process via the second kernel mode. In addition, the computing device can restrict or disable access by the first user mode and the first kernel mode to one or more pages of memory. In some instances, the one or more pages of memory can store secrets associated with the isolated process.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items or features.

DETAILED DESCRIPTION

The following detailed description generally relates to protecting application secrets from an operating system via the use of a proxy kernel and an isolated user mode. In various examples, techniques and architectures generate a secure execution environment separate from a normal execution environment. The secure execution environment can include a kernel mode and a user mode. Further, an OS kernel of the normal execution environment cannot access application data belonging to processes executing within the secure execution environment, even though the processes rely on the OS kernel for resource management.

With regard to a process executing within the normal execution environment, a processor can have two different modes: user mode and kernel mode. Further, the mode of the processor can determine restrictions on the type and scope of operations that can be performed. As such, the processor can switch between the two modes depending on the currently executing process. Typically, user application processes run in user mode, while processes belonging to the OS kernel run in kernel mode.

Further, when the execution of a user-mode application begins, the OS kernel creates a process for the application. The process can provide the application with a private virtual address space that cannot be altered by other user mode applications. In addition, the process runs within its virtual address space, and the process cannot access virtual addresses that are reserved for the OS kernel. Limiting the virtual address space of a user-mode application can prevent the application from altering, and possibly damaging OS data. However, when the processor is in kernel mode, it is assumed to be executing a trusted application, and thus kernel mode processes can execute any instruction and reference any virtual address. As such, application secrets can be accessed by a compromised or malicious OS kernel or any kernel mode process. In order to protect application secrets, examples described herein can disable access to application secrets by kernel mode processes, while relying on the kernel mode processes for kernel services.

The secure execution environment can include a second kernel mode and a second user mode. The proxy kernel can run in the second kernel mode, and one or more applications can execute in the user mode of the secure execution environment as isolated user mode applications. In order to conceal the application data of an isolated user mode application, the proxy kernel can manage access to virtual addresses associated with the secure execution environment. For instance, the proxy kernel can disable access by the OS kernel to a virtual address space associated with an isolated user mode application. Further, the proxy kernel can access virtual addresses that are reserved for the kernel.

In some examples, the proxy kernel can enforce two or more virtual trust levels. For two virtual trust levels, the higher virtual trust level can access the virtual address space of the normal execution environment and the virtual access space of the secure execution environment. However, the lower virtual trust level cannot access the virtual address space of the secure execution environment. Further, the virtual addresses associated with the secure execution environment can store data belonging to the proxy kernel and isolated user mode applications. In addition, processes executing within the normal execution environment are assigned to the lower virtual trust level. As such, data belonging to an isolated user mode application can be protected from the OS kernel, given that the OS kernel belongs to the lower virtual trust level and cannot access data belonging to the higher virtual trust level.

Individual memory pages associated with an isolated user mode processes can have different accessibility rules. For example, a first memory page can have execute read-only protections rights for processes within the lower virtual trust level, while a second memory page can have read-only protection rights for processes within the lower virtual trust level. In addition, individual memory pages associated with an isolated user mode process can have different accessibility rules for lower virtual trust level processes and higher virtual trust level processes. For instance, some isolated user mode pages, such as a memory page corresponding to the stack or heap of a process, can be inaccessible by processes executing within the lower virtual trust level. However, in some instances, memory pages can be shared between processes executing within the lower virtual trust level and higher virtual trust level. As such, the access protection for processes executing within the lower virtual trust level to a shared memory page can be read-only executable or read-only not executable.

For example, in a Windows Environment, shared libraries such as ntdll and/or kernel32 can be read-only executable by processes within the lower virtual trust level. Setting the access protections of a shared memory page as read-only prevents a process executing within the lower virtual trust level from maliciously modifying a memory page that can be used by a process within the higher virtual trust level. Access protections can include execute, execute read, execute read-write, execute write-copy, execute read-write, no access, read only, read-write, write-copy, etc.

As used herein, execute enables execute access to the page; execute read enables execute or read-only access to the page; execute read-write enables execute, read-only, or read/write access to the page; execute write-copy enables execute, read-only, or copy-on-write access to a mapped view of a file mapping object; no access disables all access to the page; read only enables read-only access to the page; read-write enables read-only or read/write access to the page; write-copy enables read-only or copy-on-write access to a mapped view of a file mapping object.

In some examples, a kernel service can execute within the higher virtual trust mode. Prior to executing the kernel service, the proxy kernel can perform a code integrity check of the kernel service. Further, the proxy kernel can set the access protection of the code corresponding to the kernel service to read-only during execution.

In addition, the proxy kernel can act as a transparent interface between isolated user mode applications and the OS kernel for the provision of OS services. In some examples, OS services, executing in kernel mode of the normal execution environment, can provide basic primitives of computation, such as threads, virtual memory, and file access, in addition to APIs (application program interfaces) such as application configuration management, GUI (graphical user interface) services, and user interfaces components. For example, the OS kernel can determine when virtual memory assigned to isolated user mode applications processes is removed from physical memory and paged to secondary storage. Further, the OS kernel can perform all I/O required to store and retrieve paged data associated with processes executing within the secure execution environment.

In some examples, an isolated user mode application can request an OS kernel service via a system call. As a result, the processor can trap into the kernel mode of the secure execution environment. Once the switch to the proxy kernel occurs, the proxy kernel can satisfy the request or dispatch the system call to the OS kernel.

In some examples, the proxy kernel can provide kernel services. For instance, the proxy kernel can provide a subset of the OS kernel services. Therefore, if a system call corresponds to a service the proxy kernel provides, the proxy kernel can satisfy the request using logic contained in the proxy kernel.

For instance, the proxy kernel can offer cryptographic services to isolated user mode applications. The proxy kernel can satisfy a request for cryptographic services such as from an isolated user mode application. Providing cryptographic services within the secure execution environment protects isolated user mode applications from the risks of relying on an untrustworthy kernel for cryptographic services that can involve isolated user mode application secrets.

In some examples, the proxy kernel cannot include scheduling functionality. For example, the OS kernel can determine when threads executing in the secure execution environment are scheduled onto CPU cores. As another example, the OS kernel can switch into the context of a process executing in the secure execution environment. As such, threads and processes executing within the secure execution environment can only call back into normal execution environment.

If the proxy kernel does not provide the OS kernel service associated with the system call, the proxy kernel can dispatch the system call to the OS kernel. The proxy kernel can securely provide application data related to the system call to the OS kernel via marshaling through system buffers. For instance, the proxy kernel can simulate call-by reference using a copy-restore technique.

Marshaling can include a process of transforming a memory representation of an object to a data format suitable for storage or transmission, and/or the transmission or storage of the object in the suitable data format. Marshaling can further include a process of communicating objects and/or data between processes and/or programs. Once a marshaled object is sent to storage or transmitted, the marshaled object can be unmarshaled into the original object.

In some other examples, the proxy kernel can copy the application data to a virtual address, and permit access by the kernel to the virtual address. Further, the proxy kernel can place the application data in a memory location the kernel has allocated to the application. As such, the proxy kernel can operate transparently to the kernel.

The proxy kernel can maintain hashes of memory pages associated with the secure execution environment in order to ensure data integrity. In some examples, the proxy kernel can verify a memory page prior to reading the contents of the memory page into memory using a hash of the memory page. Additionally, and alternatively, memory pages associated with the secure execution environment can be encrypted before being written to secondary storage, such as a hard disk, and decrypted when subsequently made available to the secure execution environment. Further, once pages are released by the proxy kernel they can be zeroed before being repurposed.

In some examples, a hypervisor can manage the normal execution environment and the secure execution environment. Further, the hypervisor can provide a virtual partition that includes the normal execution environment and the secure execution environment. In addition, the normal execution environment and the secure execution environment can utilize a guest physical address space of the virtual partition. In some examples, the hypervisor can include: Microsoft Hyper-V™, Citrix XENServer™, VMWare ESX™, etc. Further, one or more guest OSes can execute within the virtual partitions provided by the hypervisor. Guest OSes can include a Microsoft Windows™ OS, a Linux/BSD/UNIX OS, Apple® OS X™, etc.

Various examples are described further with reference to FIGS. 1-7.

Example Environments

Figure 1:
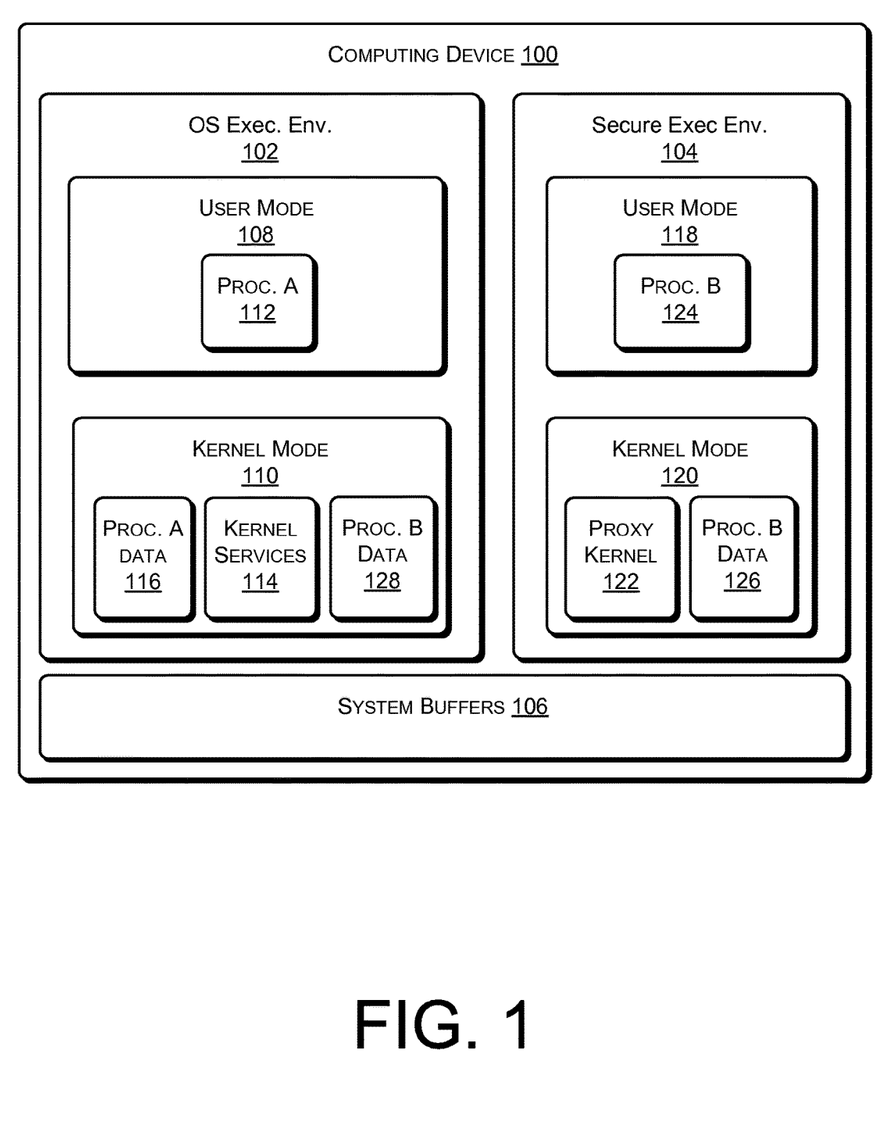
FIG. 1 is a block diagram depicting an environment for protecting application secrets from operating system attacks, according to various examples.

FIG. 1 depicts an environment including a computing device 100 for protecting application secrets from unauthorized access by an operating system, according to various examples. In some examples, the various devices and/or components of computing device 100 include an OS execution environment 102 and a secure execution environment 104 that can communicate with one another via one or more shared system buffers 106.

The OS execution environment 102 can provide a framework for code execution and provide common services for applications. In some examples, the OS execution environment 102 can include a user mode 108 and a kernel mode 110. User applications such as a process A 112, which can be an unprivileged process, can execute in the user mode 106, while OS components such as kernel services 114 can execute in the kernel mode 110.

Process A 112 can request one or more kernel services 114 via a system call. In some examples, the system call can trigger the performance of privileged instructions, such as process creation or input/output operations. Further, kernel services 114 can manage process A kernel data 116 related to the execution of process A 112. In some examples, process kernel data, such as process A kernel data 116 can include data related to memory management (e.g., virtual address space, process handle table, etc.).

The secure execution environment 104 can provide an execution environment that protects user application secrets from kernel services 114, which can be untrustworthy kernel services. The secure execution environment 104 can include a user mode 118 and a kernel mode 120. In some examples, a proxy kernel 122 can execute in the kernel mode 120 of the secure execution environment 104. Further, a process B 124 can execute as an isolated user mode application in the user mode 118 of the secure execution environment 104.

While executing within the secure execution environment 104, the process B 124 can still request a service from the kernel services 114 of the OS execution environment 102. For instance, while the process B 124 executes, the kernel services 114 can provide the process B 124 with a private virtual address space (i.e., a user space). However, the proxy kernel 122 can determine the memory access protections of the user space of the process B 124. For example, the proxy kernel 122 can disable access by the kernel services 114 to the user space of the process B 124.

In some examples, the proxy kernel 122 can provide OS kernel services to the process B 124. For instance, the proxy kernel 122 can satisfy a kernel service request issued by process B 124 by relying on its own kernel logic. The kernel logic can include a subset of the system call API of the kernel services 114. In some examples, the proxy kernel 124 can provide cryptographic services to processes executing with the secure execution environment 104. Performing cryptographic services within the secure execution environment 104 can protect confidential cryptographic information from being exposed to potentially untrustworthy kernel services 114.

The proxy kernel 122 can send a kernel service request to the kernel services 114 of the OS execution environment 102. For example, the process B 124 can request a kernel service via a system call, and the proxy kernel 122 can marshal parameters associated with process B's 124 system call to the kernel services 114. In some instances, at least part of the marshaled parameters can be stored as kernel data 128 within the normal execution environment 102.

In some instances, the proxy kernel 122 can use the shared system buffers 106 to marshal the parameters to the kernel services 114. Prior to marshaling the parameters, the proxy kernel can determine which data associated with process B 124 to provide to the kernel services 114. For instance, the proxy kernel 122 can ensure that one or more memory pages mapped to kernel data, such as process B kernel data 126 of the secure execution environment 104 are inaccessible to the kernel services 114, while making accessible one or more memory pages mapped to the kernel data, such as process B kernel data 128 of the OS execution environment 102.

In addition to controlling memory access protections to processes executing within the user mode 118 of the secure execution environment, the proxy kernel 122 can determine the memory access protections of a virtual address space associated with the kernel mode 120 of the secure execution environment 104. For instance, the kernel mode 120 can include kernel data 126 related to the execution of process B 124. Further, the proxy kernel 122 can control access by processes executing within the OS execution environment 102 to the kernel data 126. For example, the proxy kernel can disable access by the kernel services 114 to the kernel data 126. In addition, the proxy kernel 122 can prevent virtual memory associated with its processes from being paged without first being encrypted.

Figure 2:
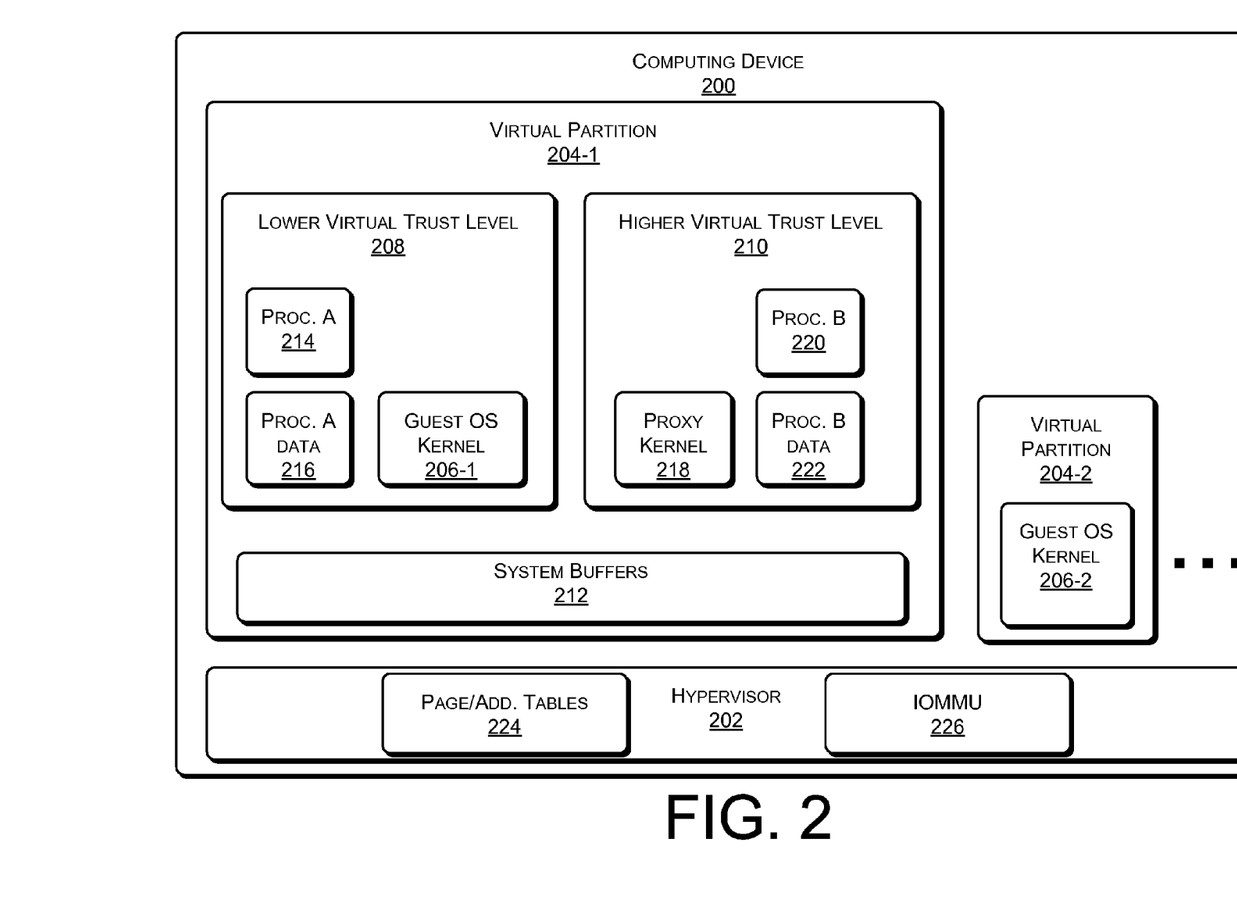
FIG. 2 is a block diagram depicting an environment for protecting application secrets from operating system attacks, according to various examples.

FIG. 2 depicts an environment including a computing device 200 for protecting application secrets from unauthorized access by an operating system, according to various examples. As shown in FIG. 2, a computing device 200 can include a hypervisor 202, and one or more virtual partitions, such as virtual partitions 204-1, 204-2, etc.

The hypervisor 202 can include a "bare metal" hypervisor that runs on the computing device 200 without an intervening OS, and in effect includes its own minimal OS. In some examples, the hypervisor 202 can manage the virtual partitions 204. Further, individual virtual partitions 204 can include a virtual machine (VM) created by the hypervisor 202. In addition, individual virtual partitions 204 can include a guest OS kernel, such as guest OS kernels 206-1, 206-2, etc. In some examples, the Guest OS kernel 206 can include the kernel of a Microsoft Windows™ OS, a Linux/BSD/UNIX OS, Apple® OS, etc.

In the illustrated example of FIG. 2, the virtual partition 204-1 can include a lower virtual trust level 208, such as the OS execution environment 102, a higher virtual trust level 210, such as the secure execution environment 104, and system buffers 212. In some examples, the system buffers 212 can be used to communicate between the lower virtual trust level 208 and the higher virtual trust level 210. Further, one or more methods of inter-process communication, such as message passing, synchronization, shared memory pages, and remote procedure calls (RPC), can be used for communication between the lower virtual trust level 208 and the higher virtual trust level 210.

The lower virtual trust level 208 can include a guest OS kernel 206-1, such as kernel services 114, a virtual process A 214, and kernel data 216 associated with the process A 214. In addition, the higher virtual trust level 210 can include a proxy kernel 218, such as proxy kernel 122, a virtual process B 220, and kernel data 222 associated with the virtual process B 220.

The hypervisor 202 can provide individual virtual partitions 204 with a virtual operating platform (e.g., a virtual machine (VM)). The virtual operating platform can include a virtual view of a processor and a virtual memory address region that is private to individual virtual partitions 204. For example, the hypervisor 202 can provide the guest OS kernel 206-1 with guest physical addresses. Further, the virtual processes 214 and 220 executing within the virtual partition 204-1 can access the guest physical addresses through page tables controlled by the guest OS kernel 206-1. Page tables typically record attributes (e.g., memory access protections) of the memory pages to which they relate, including specifying the extent to which the contents of the page can be accessed. Except as permitted by hypervisor 202, resources and activities outside the virtual container 204-1 are invisible to the virtual processes 214 and 220 within the virtual container 204-1.

In addition, the hypervisor 202 can include page and address translation tables 224 (e.g., Second Level Address Translation, Extended Page Table, etc.) that track which virtual container 206 is permitted to use each part of memory and/or storage within the computing device 201. For instance, the page and address translation tables 224 can map guest physical addresses in the virtual memory address region of the virtual containers 204 to system physical addresses of the computing device 201.

The proxy kernel 218 of the higher virtual trust level 210 can protect data belonging to processes executing within the higher virtual trust level 210. For instance, the higher virtual trust level 210 can prevent the guest OS kernel 206-1 from accessing the kernel data 222 associated with the virtual process B. In some examples, the page and address translation tables 224 of the hypervisor can be extended to permit the proxy kernel 218 to control access by the lower virtual trust level 208 to virtual addresses in use by the higher virtual trust level 210. Additionally, or alternatively, the proxy kernel 218 can alter one or more page tables of the OS kernel 206-1 to permit the proxy kernel 218 to control access by the lower virtual trust level 208 to system physical addresses in use by the higher virtual trust level 210.

Each mapping within a table can be referred to as a page table entry. The page table entries can include multiple sets of attribute fields, such as an attribute set for the lower virtual trust level 208, an attribute set for the higher virtual trust level 210, as well as other attribute sets. For example, a page entry mapped to the kernel data 222 can have the attribute set configured as 'no access' for the lower virtual trust level 208.

Figure 3:
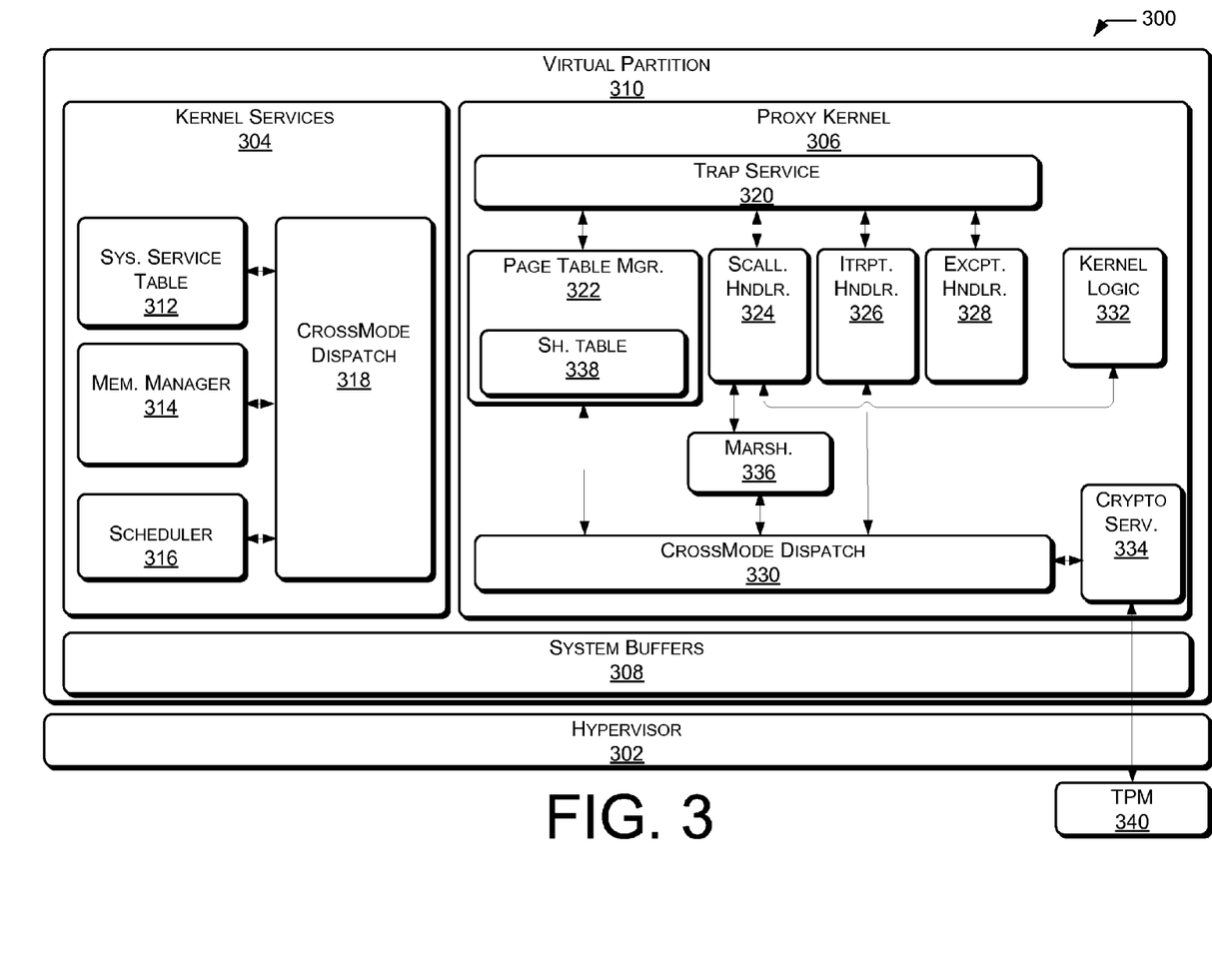
FIG. 3 is a block diagram depicting an environment for transparently providing kernel services to an isolated user mode process, according to various examples.

The hypervisor 202 can include an Input Output Memory Management Unit (IOMMU) 226. The IOMMU 226 can map device-visible virtual addresses to system physical addresses, thus providing the virtual partitions 204 passthrough access to the hardware of the computing device 201. In some examples, the IOMMU 226 can protect against direct memory access attacks FIG. 3 depicts architecture 300 for transparently providing kernel services to an isolated user mode process, according to various examples. In some examples, the various devices and/or components of environment 300 can include a hypervisor 302, such as hypervisor 202, kernel services 304, such as kernel services 114 and/or guest OS kernel 206-1, a proxy kernel 306, such as proxy kernels 120 and/or 218, and one or more system buffers 308, such as system buffers 106 and/or 212. As shown in FIG. 3, the hypervisor 302 can manage a virtual partition 310 including kernel services 304 and the proxy kernel 306. In some examples, the kernel services 304 and the proxy kernel 306 can communicate via the system buffers 308.

The kernel services 304 can include a system service table 312, a memory manager 314, a scheduler 316, and a crossmode dispatch 318. The system service table 312 can include function pointers that point to the functions of kernel services 304. Further, the system service table 312 can be protected by the kernel services 304 at the page table level, and thus only kernel mode services 304 can read and write from the system service table 310.

The memory manager 314 can manage guest physical addresses provided by the hypervisor 302 to the kernel services 304. In some cases, the memory manager 314 can include implement a virtual addressing scheme within the virtual partition 310. Further, the memory manager 314 can allocate user space to processes executing within the virtual partition 310. In addition, the memory manager 314 can reserve and commit memory, create guard pages, manage a heap, and apply file mapping. For instance, the memory manager 314 can determine when virtual memory assigned to a processes executing within the virtual partition 310 is removed from physical memory and paged to secondary storage.

The scheduler 316 can determine when to provide threads and processes executing within the virtual partition 310 with access to virtual resources. For instance, the scheduler 316 can determine when threads executing in the virtual partition 310 are scheduled onto virtual CPU cores. As another example, the scheduler 316 can perform context switching between processes executing within the virtual partition 310.

The crossmode dispatch 318 can administer communications between the kernel services 304 and the proxy kernel 306. Further, the crossmode dispatch 318 can determine whether to route a communication received from the proxy kernel 306 to at least one of the system service table 312, memory manager 314, or scheduler 316. In addition, the crossmode dispatch 318 can send and receive communications via system buffers 308.

The proxy kernel 306 can include trap code 320, a page table manager 322, a system call handler 324, an interrupt handler 326, an exception handler 328, a crossmode dispatch 330, kernel logic 332, and a cryptoservice module 334. The trap code 320 can switch to the proxy kernel 306 from another mode within the virtual partition 310. Depending on the type of interrupt or trap, the trap code 320 can pass the interrupt or trap to the page table manager 322, system call handler 324, the interrupt handler 326, or the exception handle 328. The interrupt handler 326 can handle secure interrupts received from a process executing in an isolated user mode, such as user mode 118 (not shown FIG. 3). In some examples, the kernel services 304 cannot mask or generate interrupts to the proxy kernel. The exception handler 328 can handle exceptions received from a process executing in an isolated user mode. In some examples, the exception handler 328 can be identical to an exception handler provided by the kernel services 304. The crossmode dispatch 330 can administer communications between the kernel services 304 and the proxy kernel 306.

The system call handler 324 can handle system calls received from a process executing in an isolated user mode. Further, the system call handler 324 can determine that kernel logic 332 can satisfy the service request associated with the system call. In addition, the system call handler 324 can provide the service request to the kernel logic 332. The kernel logic 332 can further satisfy the request and the processor can switch back to the process executing in the isolated user mode.

Further, the system call handler 324 can determine whether the service request should be satisfied by the kernel services 304. If the system call handler determines that a service request should be satisfied by the kernel services 304, the system call handler 324 can provide parameters associated with the system call to a marshaler/unmarshaler 336. Further, the marshaler/unmarshaler 336 can format the system call and the system call parameters for use by the kernel services 304. In some examples, the marshaler/unmarshaler 336 can also secure data associated with the isolated user mode process that generated the system call. In addition, if the kernel services 304 returns data during satisfaction of the service request, the marshaler/unmarshaler 336 can format the returned data for use by the proxy kernel 306.

The page table manager 322 can function as a memory management unit for an isolated user mode associated with the proxy kernel 306. In some examples, the proxy kernel 306 can maintain a shadow table 338 of a page table maintained by the kernel services 304. Further, the page table manager 322 can monitor system calls within the virtual partition 310 to ensure the shadow table is synchronized with the page table maintained by the kernel services 304. For instance, system calls affecting page tables can require handling by the kernel services 304 and the proxy kernel 306 to allow both a page table and its shadow table to be updated. In addition, in some examples, page faults occurring within the proxy kernel 306 are mimicked within the kernel services 304 in order to ensure the page table maintained by the kernel services 304 reflects operations within the proxy kernel 306.

Further, the page table manager 322 can control the memory access attributes of guest physical address memory pages. For example, the page table manager 322 can maintain a table identifying one or more guest physical address pages and memory access attributes of the kernel services 304 and the proxy kernel 306 to the individual guest physical address pages. For instance, the table can indicate that the kernel services 304 have no access rights to a guest physical address page, while the proxy kernel 306 has execute read-only access rights to the guest physical address page.

In some examples, the page table manager 322 can handle page faults that occur during the execution of processes within an isolated user mode associated with the proxy kernel 306. For instance, when a memory page associated with the isolated user mode process is committed, the proxy kernel 306 can release the memory page and allow the kernel services 304 to access virtual addresses associated with the memory page. In some cases, released memory can be zeroed before it can be accessed by another process.

Further, the page table manager 322 can protect memory pages associated with the proxy kernel 306 by administering encryption and cryptographic verification. For example, the page table manager 322 can verify memory pages against a hash during page fault handling. In addition, the page table manager 322 can maintain hashes of modified memory pages, and verify the memory pages during memory page commits.

For instance, if a memory page is only accessible to the proxy kernel 306, the proxy kernel 306 can encrypt the memory page before the kernel services 304 page the memory page to secondary storage. In response to a page fault, the page table manager can disable access by the kernel services 304 to the memory page, and then direct decryption of the memory page. After the memory page is decrypted, the proxy kernel 306 can verify the integrity of the memory page using a previously computed cryptographic hash. If the memory page is accessible but not modifiable (e.g., read access and/or execute access) by the kernel services 304, the page table manager 322 can ensure the integrity of the memory page during access by the kernel services 304 by computing a cryptographic hash prior to providing access to the kernel services 304, and using the cryptographic hash to verify the memory page when the proxy kernel 306 subsequently accesses the memory page.

In some examples, the encryption, hashing and validation can be performed by the cryptoservices module 334. In some examples, the cryptoservices module 334 can utilize a trusted platform module (TPM) 340 to securely perform the encryption, hashing, and validation of memory pages. In addition, the cryptoservices module 334 can include a plurality of encryption keys. For instance, the cryptoservices module 334 can include a root encryption key for individual isolated user mode applications. In some examples, the root encryption key can be provided to the proxy kernel 306 during the creation of the isolated user mode process. Further, the cryptoservices module 334 can use one or more encryption keys for secure communication and secure storage. In addition, in some examples, the isolated user mode process cannot have access to the encryption keys of the cryptoservices module 334. For instance, the proxy kernel 306 can have greater memory access permissions than an isolated user mode application.

Figure 4:
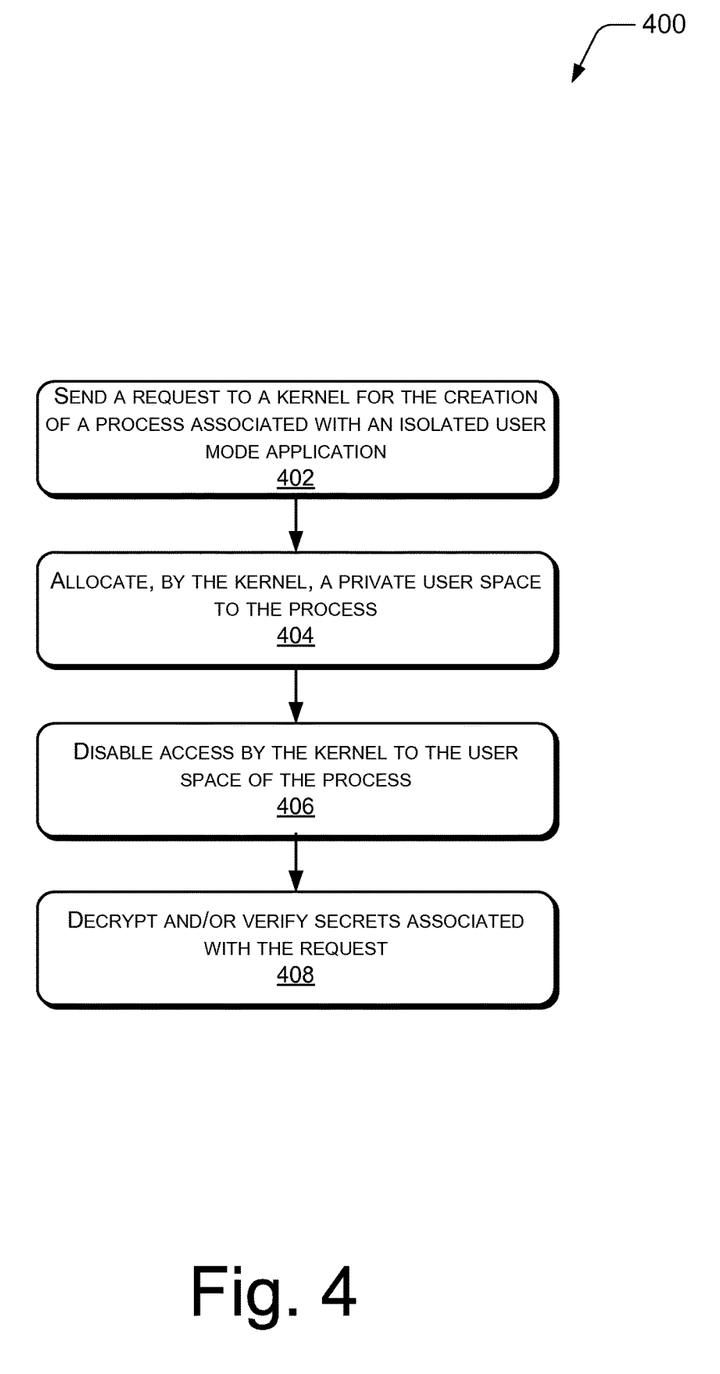
FIG. 4 is a flow diagram illustrating a process for protecting application secrets from operating system attacks, according to some examples.

FIG. 4 is a flow diagram 400 of establishing a protected address space for an isolated user mode application according to some examples. For example, the flow diagram 400 can be used during the creation of an isolated user mode process.

At 402, a request for the creation of an isolated user mode process including data identifying one or more secrets is sent to a kernel. For example, in a Windows environment, NtCreateUserProcess can be called. As another example, in a Linux environment, fork( ) can be called. Further, the request can include data identifying root encryption keys, storage encryption keys, communication encryption keys, page hashes and/or binary code to run within the process. For instance, the request can include data identifying an encrypted page hash and an encrypted key used to generate the page hash.

At 404, the kernel can allocate a private user space to the process. For example, in a Windows™ environment or Apple® iOS environment, the kernel can allocate a private virtual address space to the process.

At 406, a proxy kernel can disable access by the kernel to the private user space of the process. For example, the proxy kernel can alter an attribute set of a page entry mapped to the user space. For instance, the proxy kernel can configure the attribute set as read-only.

At 408, the proxy kernel can decrypt and/or verify the one or more secrets associated with the request. For example, the proxy kernel can decrypt the encrypted key identified in the request, and verify the page hash identified in the request using the key.

Figure 5:
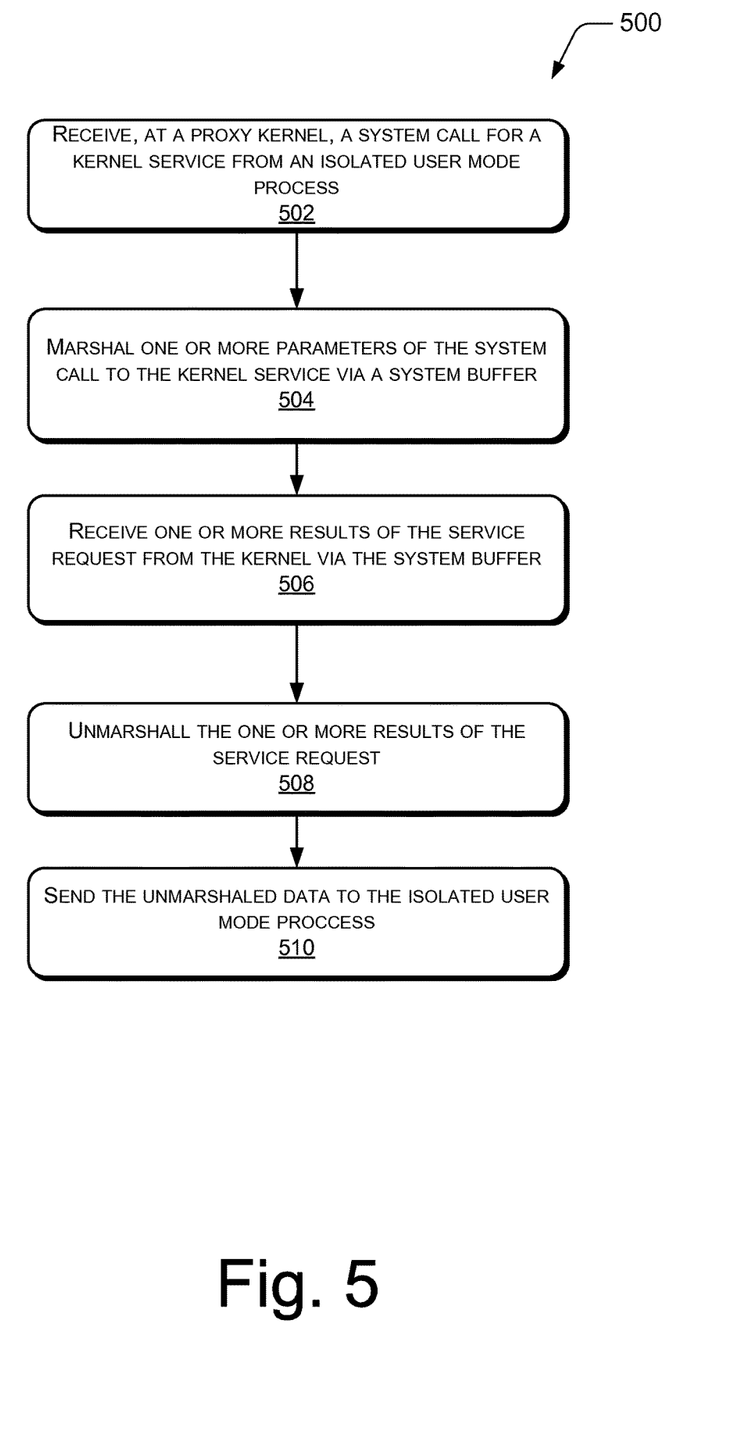
FIG. 5 is a flow diagram illustrating a process for protecting application secrets from operating system attacks, according to some examples.

FIG. 5 is a flow diagram 500 of transparently providing kernel services to an isolated user mode process via a proxy kernel according to some examples. For example, the flow diagram 500 can be used to service a system call from an isolated user mode process.

At 502, a proxy kernel can receive a system call for a kernel service from an isolated user mode process. For example, the proxy kernel can receive a request for a device from a process of an isolated user mode application. In some examples, the system call can trap into the secure execution environment of the proxy kernel. Further, in some examples, the proxy kernel can determine whether its local kernel logic can satisfy the service request.

At 504, the proxy kernel can marshal one or more parameters of the system call to the kernel service via system buffer. For example, in a Windows environment, the proxy kernel can send a message call to a kernel that includes the request for the device. Further, one or more attributes associated with the device request can be converted to a format appropriate within the normal execution environment of the kernel. In addition, the converted attributes can be provided to the kernel via a system buffer.

In some cases, the proxy kernel can communicate the system call and the parameters of the system call to the kernel service after determining that the service request cannot be satisfied by the kernel logic of the proxy kernel.

At 506, the proxy kernel can receive one or more results of the service request from the kernel via the system buffer. For example, in a Windows environment, the proxy kernel can receive a return value associated with the service request.

At 508, the proxy kernel can unmarshal the one or more results of the service request. At 510, the proxy kernel can send the unmarshaled results to the isolated user mode process. For example, if the device request includes a read, the unmarshaled results can contain data read from the requested device.

Figure 6:
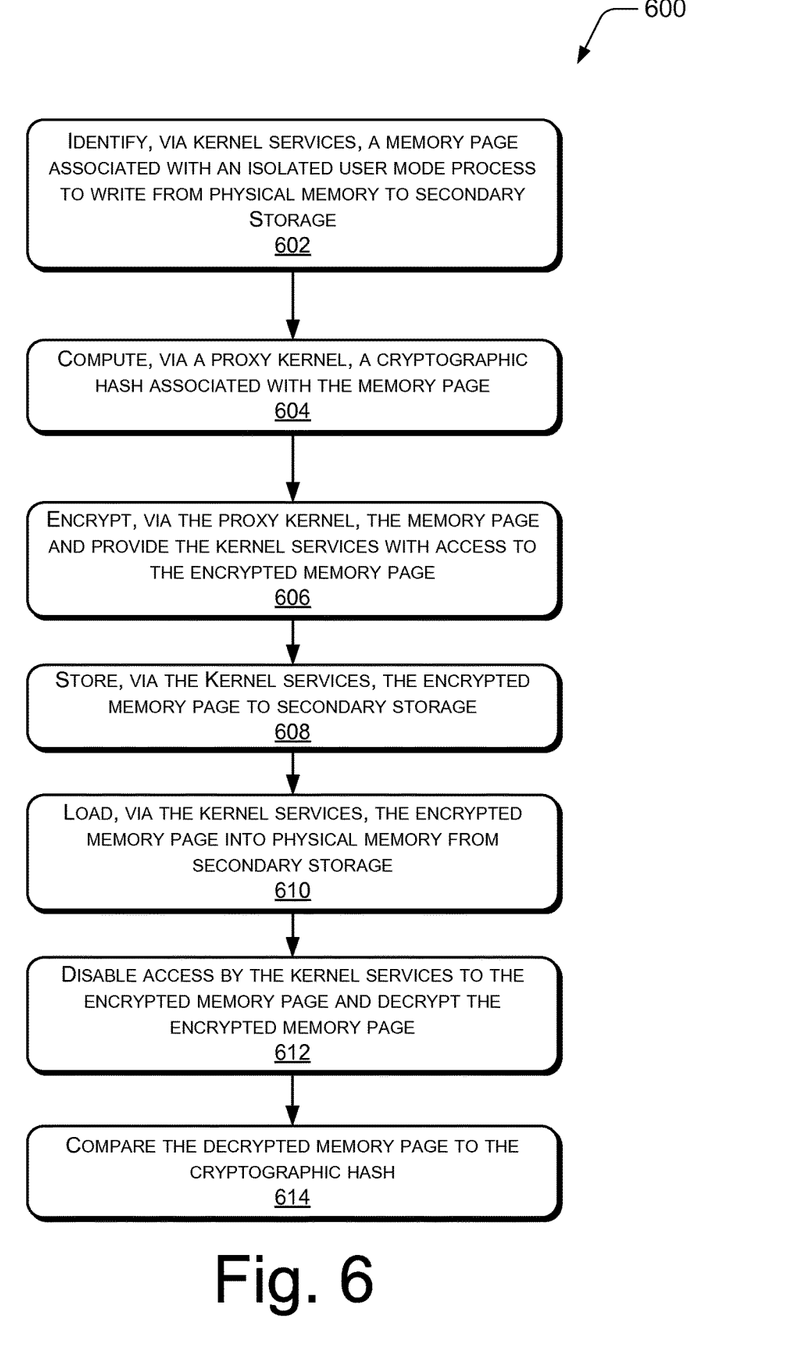
FIG. 6 is a flow diagram illustrating a process for protecting application secrets from operating system attacks, according to some examples.

FIG. 6 is a flow diagram 600 of a process for securely managing virtual memory allocated to an isolated user mode process. For example, the process illustrated in flow diagram 600 can be used when paging data associated with an isolated user mode process to and from secondary storage At 602, a kernel services module may identify a memory page associated with an isolated user mode process to write to secondary storage. For example, the memory manager 314 (not shown in FIG. 6) can identify that a memory page should be written to a hard disk based at least in part on the memory manager re-purposing the physical memory page to another use.

At 604, a proxy kernel can compute a hash of the memory page. For example, the page table manager 322 (not shown in FIG. 6) can direct the cryptographic services module 334 (not shown in FIG. 6) to compute a first cryptographic hash of the memory page.

At 606, the proxy kernel can encrypt the memory page, and provide the one or more kernel services access to the encrypted memory page. For example, the cryptographic services module 334 can encrypt the memory page, and the page table manager 322 can provide the one or more kernel services with read only access. As such, the one or more kernel services can manage the memory page but do not have access to its contents.

At 608, the one or more kernel services can store the encrypted memory page to secondary storage. For example, the memory manager 314 (not shown in FIG. 6) can store the encrypted memory page to page file on a hard disk.

At 610, the one or more kernel services can load the encrypted memory page into physical memory from the secondary storage. For example, the memory manager 314 can load the encrypted memory page into physical memory from the hard disk based at least in part on the occurrence of a page fault.

At 612, the proxy kernel can disable access by the one or more kernel services to the memory page and decrypt the encrypted memory page. For example, the page table manager 322 can disable access by the one or more kernel services 304 (not shown in FIG. 6) to the encrypted memory page, and then the cryptographic services module 334 can decrypt the encrypted memory page.

At 614, the proxy kernel can compare the memory page to the cryptographic hash. For example, the cryptographic services module 334 can compute a second hash of the memory page, and the page table manager 322 can compare the first and second cryptographic hashes to verify the integrity of the memory page.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 7:
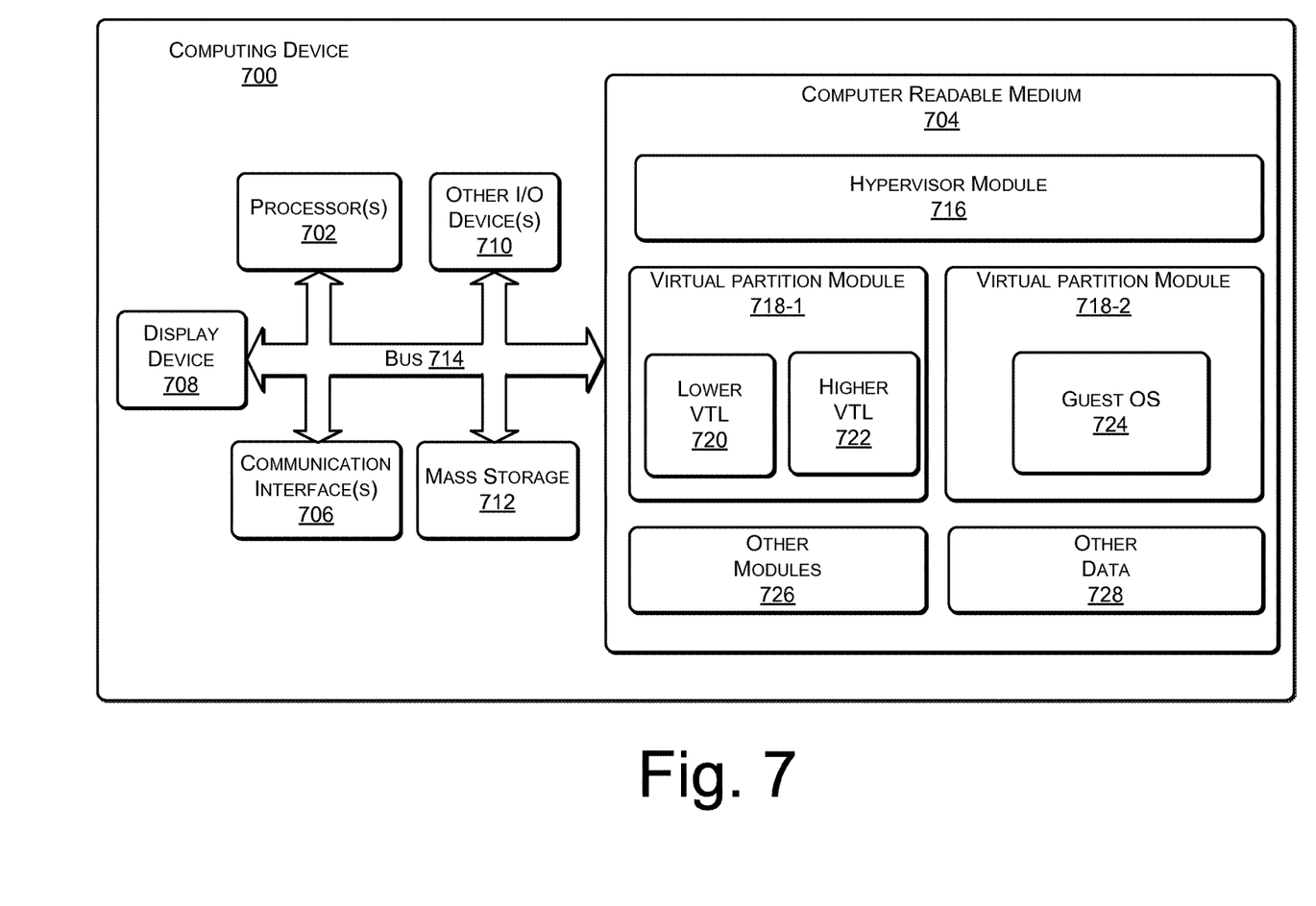
FIG. 7 is a block diagram of a computing device according to some examples.

FIG. 7 illustrates an example configuration of a computing device 700 that can be used to implement the modules and functions described herein. For example, the computing device 100 and/or computing device 200 can include an architecture that is similar to the computing device 700.

The computing device 700 can include at least one processor 702, a memory 704, communication interface(s) 706, a display device 708, other input/output (I/O) devices 710, and one or more mass storage devices 712, able to communicate with each other, such as via a system bus 714 or other suitable connection.

The processor 702 can be a single processing unit or a number of processing units, all of which can include single or multiple computing units or multiple cores. The processor 702 can be implemented as one or more microprocessors, microcomputers, microcontrollers, digital signal processors, central processing units, state machines, logic circuitries, and/or any devices that manipulate signals based on operational instructions. Among other capabilities, the processor 702 can be configured to fetch and execute computer-readable instructions stored in the memory 704, mass storage devices 712, or other computer-readable media.

Memory 704 and mass storage devices 712 are examples of computer storage media for storing instructions which are executed by the processor 702 to perform the various functions described above. For example, memory 704 can generally include both volatile memory and non-volatile memory (e.g., RAM, ROM, or the like). Further, mass storage devices 712 can generally include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 can be collectively referred to as memory or computer storage media herein, and can be a non-transitory media capable of storing computer-readable, processor-executable program instructions as computer program code that can be executed by the processor 702 as a particular machine configured for carrying out the operations and functions described in the examples herein.

Although illustrated in FIG. 7 as being stored in memory 704 of computing device 700, the modules 716, 718, and 720, or portions thereof, can be implemented using any form of computer-readable media that is accessible by computing device 700. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media can embody computer readable instructions, data structures, program modules, or other data in a modulated data signal, such as a carrier wave, or other transmission mechanism. As defined herein, computer storage media does not include communication media.

The computing device 700 can also include one or more communication interface(s) 706 for exchanging data with other devices, such as via a network, direct connection, or the like, as discussed above. The communication interfaces 706 can facilitate communications within a wide variety of networks and protocol types, including wired networks (e.g., LAN, cable, etc.) and wireless networks (e.g., WLAN, cellular, satellite, etc.), the Internet and the like. Communication interfaces 706 can also provide communication with external storage (not shown), such as in a storage array, network attached storage, storage area network, or the like.

A display device 708, such as a monitor can be included in some examples for displaying information and images to users. Other I/O devices 710 can be devices that receive various inputs from a user and provide various outputs to the user, and can include a touch input device, a gesture input device, a camera, a keyboard, a remote controller, a mouse, a printer, audio input/output devices, and so forth.

Memory 704 can include modules and components for linking records based on a blocking scheme according to the examples described herein. The memory 704 can include multiple modules to perform various functions, such as a hypervisor module 716, such as hypervisor 202, one or more virtual partition modules, such as 718-1 and 718-2. The hypervisor module 716 can be used to manage one or more virtual partitions, such as the virtual partitions 718-1 or 718-2. Further, virtual partition module 718-1 can include a lower virtual trust level 720, such as lower virtual trust level 208, and a higher virtual trust level 722, such as higher virtual trust level 210. In addition, the virtual partition module 718-2 can include a guest OS 724, such as guest OS 206-2. The memory 704 can also include other modules 726 that implement other features and other data 728 that includes intermediate calculations and the like.

Example Clauses

A: method, comprising: managing an operating system execution environment comprising a first user mode and a first kernel mode; managing a secure execution environment comprising a second user mode and a second kernel mode; executing an isolated process within the second user mode of the secure execution environment; providing one or more system services of the first kernel mode to the isolated process via the second kernel mode; and protecting the isolated process from an attack from the system services by disabling access by the first user mode and the first kernel mode to one or more pages of memory.

B: A method as paragraph A recites, wherein disabling access includes disabling at least one of read, write, or execute access to pages of memory.

C: A method as paragraph A or B recites, wherein disabling access includes disabling write access while permitting at least one of read or execute access.

D: A method as any of paragraphs A-C recites, wherein the operating system execution environment and the secure execution environment are managed by a hypervisor.

E: A method as any of paragraphs A-D recites, further comprising: allocating, by the one or more services of the first kernel mode, the one or more pages of memory to the isolated process; encrypting the one or more pages of memory to form one or more encrypted pages of memory; and storing, by the one or more services of the first kernel mode, the one or more encrypted pages of memory to a hard disk.

F: A method as any of paragraphs A-E recites, further comprising: loading, by the one or more services of the first kernel mode, the one or more encrypted pages of memory into a physical memory based in part on a page fault; decrypting the one or more encrypted pages of memory to form one or more decrypted pages of memory; and verifying the integrity of the one or more decrypted pages of memory G: A method as any of paragraphs A-F recites, further comprising: sending a system call to one of the one or more system services of the first kernel mode from the isolated process via a proxy service of the second kernel mode; determining system call parameters to provide to the one or more services of the first kernel mode; and marshaling the system call parameters to the one or more services of the first kernel mode via a system buffer.

H: A method as any of paragraphs A-G recites, further comprising: transparently communicating data associated with the execution of the system call by the one or more system services of the first kernel mode to the isolated process via the proxy service of the second kernel mode.

I: A computer readable medium having computer-executable instructions thereon, the computer-executable instructions to configure a computer to perform a method as any of paragraphs A-H recites.

J: A device comprising: a computer-readable media having computer-executable instructions thereon to configure a computer to perform a method as any one of paragraphs A-H recites, the processing unit adapted to execute the instructions to perform the method as any of paragraphs A-H recites.

K: A system comprising means for performing a method as any of paragraphs A-H recites.

L: A system, comprising one or more processors; a memory; an address space mapped to one or more addresses of the memory; a first trust level associated with first access rights to the address space; a second trust level associated with a second access rights to the address space, wherein the second access rights provide greater access to the address space than the first access rights; a kernel executing on the one or more processors in the first trust level according to the first access policy; a proxy kernel executing on the one or more processors in the second trust level according to the second access policy; and one or more application processes executing on the one or more processors in the second trust level, wherein the proxy kernel transparently communicates service requests between the application processes and the kernel without exposing secrets of the one or more application processes to the kernel.

M: A system as paragraph L recites, further comprising: a first group of addresses within the address space accessible to the kernel in accordance with the first access policy and a second group of addresses within the address space wherein the kernel has limited access in accordance with the first policy, and the proxy kernel has full access in accordance with the second access policy.

N: A system as paragraphs L or M recites, further comprising: a page table manager module, executing in the second trust level according to the second access policy, programmed to: maintain a shadow table of a page table of the kernel; and determine the occurrence a page fault associated with a guest physical address page mapped to the second group of addresses.

O: A system as any of paragraphs L-N recites, wherein the first access policy includes at least one of: disabling at least one of read, write, or execute access to second group of address space; or disabling write access while permitting at least one of read and execute access to the address space.

P: A system as any of paragraphs L-O recites, further comprising: a cryptographic module programmed to verify the guest physical address page based in part on a cryptographic hash.

Q: A system as any of paragraphs L-P recites, wherein the address space is associated with guest physical addresses provided by a hypervisor, and the first trust level and second trust level represent virtual trust levels of a virtual partition provided by the hypervisor.

R: A system as any of paragraphs L-Q recites, further comprising a system buffer for transparently communicating the service requests between the application processes and the kernel.

S: A computer-readable medium having thereon computer-executable instructions, the computer-executable instructions upon execution configuring a computer to perform acts comprising: generating a system call for the creation of an isolated user mode process for an user application; allocating, by a kernel, a virtual address space for the isolated user mode process; and disabling access by the kernel to the virtual address space, wherein access to the virtual address space is disabled by a proxy kernel modifying memory access attributes of one or more guest physical address memory pages mapped to the virtual address space.

T: A computer-readable medium as paragraph S recites, further comprising generating a first cryptographic hash of the one or more guest physical address memory pages; generating a second cryptographic hash of the one or more guest physical address memory pages based at least in part on the occurrence of a page fault; and verifying the one or more memory pages based at least in part on a comparison of the first cryptographic hash and the second cryptographic hash.

U: A computer-readable medium as any of paragraphs S-T recites, wherein the system call represents a first system call, and the acts further comprise: generating, by the isolated user mode process, a second system call requesting one or more kernel services provided by the kernel; marshaling parameters associated with the second system call to the kernel; and providing the one or more services from the kernel to the isolated user mode process.

V: A computer-readable medium as any of paragraphs S-U recites, wherein the acts further comprise switching to a context of the isolated user mode process by the kernel.

W: A computer-readable medium as any of paragraphs S-V recites, wherein disabling access includes at least one of: disabling at least one of read, write, or execute access to the one or more memory pages; or disabling write access while permitting at least one of read and execute access to the one or more memory pages.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 101, 201, and/or 700 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof. Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method, comprising:
   managing an operating system execution environment comprising a first user mode and a first kernel mode;
   executing a single operating system in the first kernel mode, the executing the single operating system comprising providing one or more operating system services of the single operating system to one or more processes of the first kernel mode;
   managing a secure execution environment comprising a second user mode and a second kernel mode;
   executing an isolated process within the second user mode of the secure execution environment;
   providing the one or more operating system services of the single operating system executing in the first kernel mode to the isolated process via the second kernel mode; and
   protecting the isolated process from an attack from the one or more operating system services by disabling access by the first user mode and the first kernel mode to one or more pages of memory.

2. A method as claim 1 recites, wherein disabling access includes disabling at least one of read, write, or execute access to pages of memory.

3. A method as claim 1 recites, wherein disabling access includes disabling write access while permitting at least one of read or execute access.

4. A method as claim 1 recites, wherein the operating system execution environment and the secure execution environment are managed by a hypervisor.

5. A method as claim 1 recites, further comprising:
   allocating, by the one or more services of the first kernel mode, the one or more pages of memory to the isolated process;
   encrypting the one or more pages of memory to form one or more encrypted pages of memory; and
   storing, by the one or more services of the first kernel mode, the one or more encrypted pages of memory to a hard disk.

6. A method as claim 5 recites, further comprising:
   loading, by the one or more services of the first kernel mode, the one or more encrypted pages of memory into a physical memory based in part on a page fault;
   decrypting the one or more encrypted pages of memory to form one or more decrypted pages of memory; and
   verifying an integrity of the one or more decrypted pages of memory.

7. A method as claim 5 recites, further comprising:
   sending a system call to one of the one or more operating system services of the first kernel mode from the isolated process via a proxy service of the second kernel mode;
   determining system call parameters to provide to the one or more services of the first kernel mode; and
   marshaling the system call parameters to the one or more services of the first kernel mode via a system buffer including shared memory pages.

8. A method as claim 7 recites, further comprising transparently communicating data associated with the execution of the system call by the one or more operating system services of the first kernel mode to the isolated process via the proxy service of the second kernel mode.

9. A system, comprising:
   one or more processors;
   a memory;
   an address space mapped to one or more addresses of the memory;
   a first trust level associated with a first access policy to the address space;
   a second trust level associated with a second access policy to the address space, wherein the second access policy provide greater access to the address space than the first access policy;
   a kernel comprising an operating system executing on the one or more processors in the first trust level according to the first access policy, the operating system providing one or more operating system services to one or more processes operating in the first trust level;
   a proxy kernel executing on the one or more processors in the second trust level according to the second access policy; and
   one or more application processes executing on the one or more processors in the second trust level, wherein the proxy kernel transparently communicates service requests between the one or more application processes and the kernel without exposing secrets of the one or more application processes to the kernel, the service requests comprising one or more system calls for use of at least one of the one or more operating system services provided by the single operating system executing in the first trust level.

10. A system as claim 9 recites, further comprising a first group of addresses within the address space accessible to the kernel in accordance with the first access policy and a second group of addresses within the address space wherein the kernel has limited access in accordance with the first access policy, and the proxy kernel has full access in accordance with the second access policy.

11. A system as claim 10 recites, further comprising:
    one or more modules, executing in the second trust level according to the second access policy, programmed to:
    maintain a shadow table of a page table of the kernel; and determine an occurrence of a page fault associated with a guest physical address page mapped to the second group of addresses.

12. A system as claim 11 recites, wherein the first access policy includes at least one of:
disabling at least one of read, write, or execute access to second group of address space; or
disabling write access while permitting at least one of read and execute access to the address space.

13. A system as claim 11 recites, further comprising a cryptographic module programmed to verify the guest physical address page based in part on a cryptographic hash.

14. A system as claim 13 recites, wherein the address space is associated with guest physical addresses provided by a hypervisor, and the first trust level and second trust level represent virtual trust levels of a virtual partition provided by the hypervisor.

15. A system as claim 11 recites, further comprising a system buffer for transparently communicating the service requests between the application processes and the kernel.

16. One or more computer storage media storing computer-executable instructions that, when executed on one or more processors, configure a computer to perform acts comprising:
generating a first system call for creation of an isolated user mode process for a user application;
allocating, by a kernel comprising an operating system, a virtual address space for the isolated user mode process;
disabling access by the kernel to the virtual address space, wherein access to the virtual address space is disabled by a proxy kernel modifying memory access attributes of one or more guest physical address memory pages mapped to the virtual address space;
generating, by the isolated user mode process, a second system call requesting one or more operating system services provided by the operating system;
marshaling parameters associated with the second system call to the operating system; and
providing the one or more operating system services from the kernel to the isolated user mode process.

17. One or more computer storage media as claim 16 recites, wherein the acts further comprise:
generating a first cryptographic hash of the one or more guest physical address memory pages;
generating a second cryptographic hash of the one or more guest physical address memory pages based at least in part on an occurrence of a page fault; and
verifying the one or more memory pages based at least in part on a comparison of the first cryptographic hash and the second cryptographic hash.

18. One or more computer storage media as claim 16 recites, wherein the acts further comprise switching to a context of the isolated user mode process by the kernel.

19. One or more computer storage media as claim 16 recites, wherein disabling access includes at least one of:
disabling at least one of read, write, or execute access to the one or more memory pages; or
disabling write access while permitting at least one of read and execute access to the one or more memory pages.

20. The method of claim 1, wherein the isolated process is executed independent of another operating system different than the single operating system.

* * * * *